J. GUNZENDORFER.
AMUSEMENT APPARATUS.
APPLICATION FILED JULY 20, 1911.
1,037,474.
Patented Sept. 3, 1912.
2 SHEETS—SHEET 1.
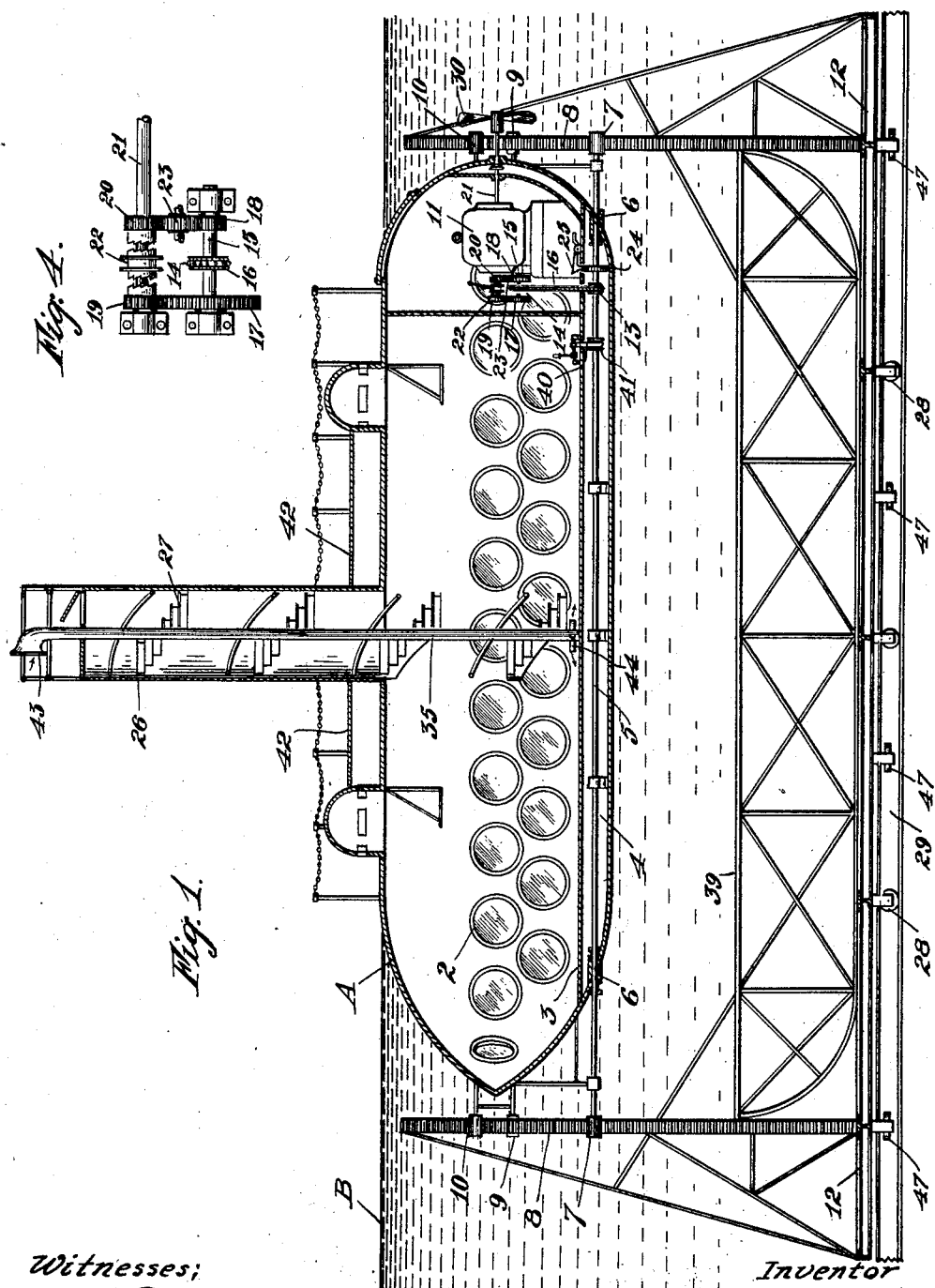
Witnesses:
R. L. Berry
Thos. Fastberg
Inventor
Jacob Gunzendorfer,
By G. H. Strong
Att'y.

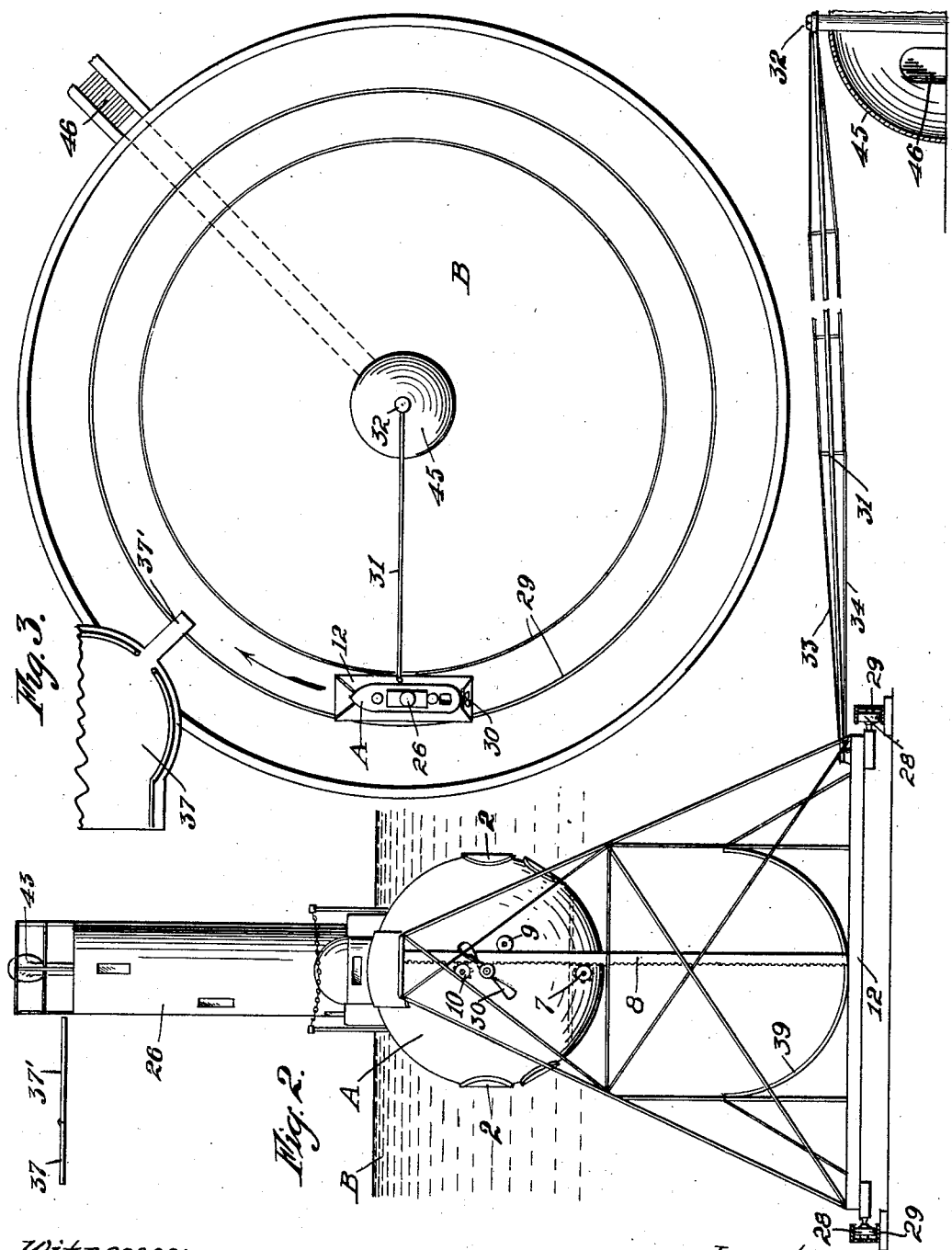

UNITED STATES PATENT OFFICE.

JACOB GUNZENDORFER, OF SAN FRANCISCO, CALIFORNIA.

AMUSEMENT APPARATUS.

1,037,474.  Specification of Letters Patent.  Patented Sept. 3, 1912.

Application filed July 20, 1911. Serial No. 639,621.

*To all whom it may concern:*

Be it known that I, JACOB GUNZENDORFER, a citizen of the United States, residing in the city and county of San Francisco and State of California, have invented new and useful Improvements in Amusement Apparatus, of which the following is a specification.

This invention relates to an aquatic amusement device and particularly pertains to a passenger carrying structure which is adapted to be submerged and propelled through a body of water in simulation of a submarine boat.

It is the object of this invention to provide a submarine structure which is especially adapted for installation in pleasure gardens, recreation parks and similar places of amusement, and by means of which passengers may be conveyed beneath the surface of a body of water and which is so constructed and designed as to produce the actual sensations experienced in traveling in a submarine boat.

A further object is to provide a submarine amusement apparatus, which is safe and reliable and which is not liable to get out of order, and from which egress may be had at all times, thus rendering it safe and free from danger.

The invention consists of the parts and the combination and construction of parts as hereinafter more fully described and claimed, having reference to the accompanying drawings, in which—

Figure 1 is a longitudinal section of the invention. Fig. 2 is a rear end view. Fig. 3 is a diagrammatic plan view showing the application of the invention and the method of operating same. Fig. 4 is a detail of the driving mechanism.

In the drawings A represents a suitable boat, bell, box, car, cylinder, or other suitably shaped and constructed vessel made of suitable water-proof material designed and constructed to receive and carry passengers; this vessel being placed in a suitable water containing receptacle or tank B, either artificial, or a natural body of water as a lake, canal or river, or other suitable body of water. Preferably, the vessel A is made of metal and cigar-shaped, and constitutes the hull or passenger conveyance of the apparatus. The vessel is provided with suitable windows 2 for observation purposes. A level floor or deck 3 is constructed in the hull A a short distance above the bottom thereof, forming a bilge space 4 beneath the floor, as shown in Fig. 1. Extending longitudinally of the hull A within the bilge space 4 is a revoluble shaft 5 supported in suitable bearings and extending through both ends of the hull A through stuffing boxes 6 and projecting some distance therebeyond. Mounted on the outer ends of the shaft 5 are pinions 7 which mesh with vertically disposed toothed racks 8; the pinions 7 being retained constantly in mesh with the toothed racks 8 by means of idle rollers 9 mounted on the hull A which bear against the smooth back of the toothed rack 8, and idler pinions 10 mounted on the hull A, which mesh with the toothed racks 8 and are disposed some distance above the pinions 7 and rollers 9.

The shaft 5 is adapted to be rotated through a suitable transmission mechanism from a motor 11 disposed in an engine room formed in the hull A. The revoluble shaft 5 with the pinions 7 thereon and the vertical racks 8 are provided as a means for raising and lowering the hull A; the racks 8 being rigidly mounted on a suitable frame 12, in such manner that when the shaft 5 and the pinions thereon are rotated the latter will travel up or down on the racks 8 as desired, and carry the hull A therewith.

The transmission mechanism between the shaft 5 and the motor 11 may be of any suitable description and is here shown as consisting of a sprocket 13 on the shaft 5, a sprocket 14 on a countershaft 15, a sprocket chain 16 connecting the sprockets 13 and 14; gears 17 and 18 on the countershaft 15 and gears 19—20 on the drive shaft 21 of the motor 11 as particularly shown in Fig. 4. The gears 19 and 20 are loose on the drive shaft 21 and are adapted to be alternately connected to the drive shaft 21 by means of a double-faced clutch member 22 feathered on the shaft 21 and adapted to be alternately thrown into engagement with clutch members formed on the gears 19—20. The gear 19 meshes directly with the gear 17 while the gear 20 meshes with the gear 18 on the countershaft 15 through an idler gear 23, in such manner that when the gear 19 is rotated with the shaft 21, the shaft 5 and pinions 7 will be rotated in such direction as to move the hull A in a downward direction, and when the gear 20 is engaged with the shaft 21 through the clutch 22 the shaft 5 and pinions 7 will be rotated in such manner as to move the hull A in an upward direction. The clutch 22 is arranged to be disposed intermediate of the gears 19 and 20 and out of engagement therewith so that the drive-shaft 21 may be rotated independent of and without operating the gears 19 and 20.

Means are provided for locking the shaft 5 against movement when the clutch 20 is disposed in its intermediate or inoperative position. This means is here shown as consisting of a square toothed ratchet 24 on the shaft 5 and a pawl 25 which is adapted to be thrown into engagement with the sprocket 24 as desired, and thereby lock the shaft 5 against movement. The locking of the shaft 5 is provided as a means for retaining the hull A in rigid relation to the toothed racks 8 in any desired position thereon. Any other suitable means for rotating the shaft 5 in either direction and for locking it against movement may be substituted for that shown, if desired.

Ingress to and egress from the hull A is obtained through a conning tower 26, which is disposed amidships of the hull A and extends some distance thereabove; a winding stair 27 leading from the upper end of the conning tower 26 to the floor 3 in the hull A. The entrance or hatchway to the conning tower 26 in the upper end thereof, is adapted to be closed to prevent the passage of water therethrough which water might splash upon the upper end of the conning tower when the hull A is submerged.

The carriage 12, on which the toothed racks 8 are mounted, is provided with rollers 28 which are adapted to travel in a circular track 29; the track 29 being provided with an inwardly extending flange on its upper edge which projects over the rollers 28 so that the carriage 12 cannot be lifted vertically from the track. The carriage 12 is designed to be propelled around the circular track 29 by means of a propeller 30, mounted on the drive shaft 21 of motor 11, and disposed astern of the hull A. The track 29 is mounted on a bed of a suitable reservoir or tank and being necessarily of a small diameter in comparison with the length of the carriage 12, means are provided for centralizing the carriage 12 on the track 29. This means is here shown as consisting of an arm 31 one end of which is connected to the carriage 12 intermediate of its length, as shown in Figs. 2—3; the other end of the arm 31 being pivoted in any suitable manner at a point 32 corresponding to the center of the circular track 29. The arm 31 acts to maintain the carriage 12 in the center of the track 29 and prevents the weight of the carriage 12 and its load being thrown on the outermost rail of the track 29. The arm 31 also serves as a support for the electrical conductors 33 through which electricity is delivered to the motor 11 and to suitable lighting fixtures installed within the hull A and which conductors lead from any source of electric supply through the pivot connection 32 on the arm 31. Air-tubes 34 are also carried by the arm 31 and lead from any suitable source of air pressure exterior of the reservoir or tank, through the pivotal connection 32, to the interior of the hull A. Air may be supplied to the interior of the hull A through a pipe 35 disposed in the conning tower 26 and extending from the upper end thereof to a suitable point within the hull A.

In the operation of the invention the carriage 12 carrying the hull A between the racks 8, is moved to a point in which the upper end of the conning tower 26 will be disposed adjacent a landing 37, from which a gang plank 37' may be lowered to rest upon the conning tower 26 when the hull A is in its uppermost position, as shown in Figs. 2—3. In this position passengers are free to enter or to depart from the hull A through the conning tower 26. Passengers having been taken aboard the hull A, the hatch of the conning tower 26 may be closed, whereupon the motor 11 is set in operation so as to rotate the drive shaft 21 and thereby rotate the propeller 30 and the clutch member 22 thereon. The clutch member 22 is then thrown into engagement with the clutch member on the gear 19 so as to rotate the latter and set the gear 17 and countershaft 15 in motion and thereby rotate the shaft 5 and pinions 7 in such direction as to cause the latter to move downward on the toothed racks 8 and thereby submerge the submarine. The moment the hull A reaches its lowermost position the clutch 22 is thrown out of engagement with the gear 19 and is disposed in its intermediate position whereupon the pawl 25 is thrown into locking engagement with the ratchet 24 on the shaft 5 to retain the hull A of the submarine in its submerged position. In this position the hull A will rest within a frame-work 39 mounted on the carriage 12, which frame-work acts to take the lateral strain off the pinions 7–10 and the rollers 9 on the vertical racks 8. The length of the conning tower 26 is such that its upper end will project a short distance above the water when the hull A is in its lowermost position. This arrangement admits of the easy egress of the passengers and crew of the submarine in event the elevating mechanism becomes inoperative, and insures a safe and certain means of escape from the interior of the hull A at all times. When it is desired to raise the hull A, the clutch member 22 is thrown into engagement with the gear 20 so as to rotate the shaft 5 to cause the pinion 7 to travel upward on the racks 8, as heretofore described; the pawl 25 being previously thrown out of engagement with the ratchet 24. If desired, the buoyancy of the hull A may be employed in raising it to its uppermost position in which event the clutch member 22 and gears 20 will not be used. In this case the pawl 25 will be released from the ratchet 24 so as to free the shaft 5 whereupon the buoyancy of the hull A will cause it to rise, the pinion 7 riding upward upon the racks 8 therewith; a handbrake 40 acting on a drum 41 on the shaft 5 being employed as a means of retarding the upward movement of the hull. Water tight air compartments 42 are provided on the top of the hull A to add to its buoyancy.

Ventilation is provided for by suitable means, preferably by natural draft from an air intake 43 through the conning tower at some point above the permanent water line, thence by connecting pipe 35 to a series of vents 44 distributed throughout the interior of the vessel. The radius rod or arm 31 which connects to a central post 32 forms means for the necessary electrical connections and the light between the vessel and the exterior of the tank without interfering with the movements of the vessel or detracting from the submarine appearance. Preferably there is arranged around the central post 32 a submerged chamber 45 having transparent walls through which vari-colored lights may show beneath the water, enhancing the beauty and novelty of the scene. Ingress and egress is had to the chamber 45 from a point outside the water tank B through a water tight tunnel 46.

From the foregoing it will be seen that I have devised a novel, entertaining and instructive amusement apparatus, which may be employed in demonstrating the science of submarine travel with the trilling sensations attendant thereto. Many interesting and spectacular effects may be obtained by arranging various structures illuminated or otherwise, illustrating marine life, parallel to the path of travel of the submerged vessel.

Horizontal guide rollers 47 are mounted on the carriage 12 and are adapted to bear against the inside faces of the rails 29. These rollers 47 act as bearings to reduce the friction due to the side thrust of the carriage 12 against the rails.

It will be observed that the hull A is maintained in an upright position and held against capsizing by means of the pinions 7-10, and idle rollers 9 which engage the toothed racks 8 on opposite sides.

While I have particularly shown and described the means for submerging the hull A as consisting of the toothed racks 8, pinions 7 and their connections, it is obvious that any suitable and appropriate mechanism other than this may be employed, if desired. It is also obvious that driving mechanism other than the propeller 30 may be used for propelling the structure along the track rails 29.

Having thus described my invention, what I claim and desire to secure by Letters Patent is—

1. In an aquatic amusement device, the combination of a submerged carriage, tracks on which the carriage travels, a submergible passenger conveyance connected with the carriage, a propeller means for driving the carriage and conveyance through the water in simulation of a submarine, and rack and pinion mechanism on the carriage and conveyance for raising and lowering the conveyance independently of the carriage.

2. In an aquatic amusement device, the combination of a submerged carriage, tracks on which the carriage travels, a submergible passenger conveyance connected with the carriage, a propeller means for driving the carriage and conveyance through the water in simulation of a submarine, and means for raising and lowering the conveyance independently of the carriage, said conveyance having a conning tower through which ingress and egress is had, the entrance to said conning tower always being above the water level.

3. The combination with a water containing receptacle, a submerged track therein, a carriage adapted to run on said track, a submergible vessel connected with the carriage and having means of ingress and egress, a central submerged water tight chamber concentric with the track and having a water tight tunnel or passage extending outside the receptacle for giving ingress and egress to the chamber, and connections between the chamber and the carriage.

4. The combination with a water-containing receptacle, of a submerged continuous track therein, a carriage running on the track, said carriage having fore and aft vertically disposed guides, a conveyance for passengers contained between the guides and submergible and adapted to convey passengers underneath the water, and means acting on the water to propel the carriage.

5. An amusement apparatus comprising a submerged carriage, a floating structure attached to said carriage, means including vertical guide racks on the carriage and driven pinions on the floating structure by which said floating structure may be raised and lowered in relation to said carriage, and means for propelling said carriage and said floating structure in unison.

6. An amusement apparatus comprising a submerged carriage, a track on which said carriage is adapted to travel, a passenger carrying floating structure attached to said carriage, means including racks and motor driven pinions on the carriage and floating structure by which said structure may be raised and lowered in relation to said carriage, and means for propelling the carriage and the floating structure along the track in unison.

7. An amusement apparatus comprising a submerged carriage, a track on which said carriage is adapted to travel, a passenger carrying floating structure attached to said carriage, and means by which said structure may be raised and lowered in relation to said carriage, said means including vertically disposed toothed racks on said carriage, a revoluble shaft carried by the floating structure, pinions on said shaft meshing with said racks and means for rotating said shaft.

8. An amusement apparatus comprising a submerged carriage, a track on which said carriage is adapted to travel, a passenger carrying floating structure attached to said carriage, means by which said structure may be raised and lowered in relation to said carriage, said means including vertically disposed toothed racks at each end of said carriage, a revoluble shaft carried by the floating structure and projecting beyond the ends thereof, pinions on the projecting ends of said shaft meshing with said racks, means for rotating said shaft, and means for propelling the carriage and the floating structure along the track in unison.

9. An amusement apparatus comprising a submerged carriage, a track on which said carriage is adapted to travel, a passenger carrying floating structure attached to said carriage, means by which said structure may be raised and lowered in relation to said carriage, said means including vertically disposed toothed racks on said carriage, a revoluble shaft carried by the floating structure said shaft extending longitudinally through the structure and projecting beyond the ends thereof, pinions on the projecting ends of said shaft meshing with said racks, means for rotating said shaft, and means for propelling the carriage and the floating structure along the track in unison, said means consisting of a screw propeller mounted on said floating structure.

10. An amusement apparatus comprising a combination, a submerged carriage, a circular track on which said carriage is adapted to travel, a floating structure adapted to carry passengers attached to said carriage, and means by which the floating structure may be raised and lowered including vertically disposed toothed racks on said carriage, a revoluble shaft carried by the floating structure, pinions on said shaft meshing with said racks, and means for rotating said shaft in either direction to cause the pinions to travel on said racks.

11. An amusement apparatus comprising in combination, a submerged carriage, a circular track on which said carriage is adapted to travel, a floating structure adapted to carry passengers attached to said carriage, means by which the floating structure may be raised and lowered including vertically disposed toothed racks at the ends of said carriage, motor driven pinions on said floating structure meshing with said racks, means for rotating said pinions in either direction to cause them to travel on said racks, means for propelling the carriage along the circular track consisting of a screw propeller mounted on said floating structure, and means for retaining the carriage in the center of the track.

12. An amusement apparatus comprising in combination a submerged carriage, a circular track on which said carriage is adapted to travel, a floating structure adapted to carry passengers attached to said carriage, means by which the floating structure may be raised and lowered including vertically disposed toothed racks on said carriage, a revoluble shaft carried by the floating structure, pinions on said shaft meshing with said racks, a clutch mechanism for rotating said shaft in either direction to cause the pinions to travel on said racks, means for propelling the carriage along the circular track, consisting of a screw propeller mounted on said floating structure, and means for retaining the carriage in the center of the tracks, said means consisting of an arm attached to said carriage and pivoted at the center of the circular track.

In testimony whereof I have hereunto set my hand in the presence of two subscribing witnesses.

JACOB GUNZENDORFER.

Witnesses:
 JOHN H. HERRING,
 FRANCES V. COLE.

---

Copies of this patent may be obtained for five cents each, by addressing the "Commissioner of Patents, Washington, D. C."